United States Patent [19]
McCulloch et al.

[11] Patent Number: 6,016,697
[45] Date of Patent: Jan. 25, 2000

[54] CAPACITIVE LEVEL SENSOR AND CONTROL SYSTEM

[75] Inventors: L. Michael McCulloch; Richard E. Bruer; Thomas P. Byram, all of Knoxville, Tenn.

[73] Assignee: American Magnetics, Inc., Oak Ridge, Tenn.

[21] Appl. No.: 08/926,356

[22] Filed: Sep. 9, 1997

[51] Int. Cl.$^7$ .................................................. G01F 23/00
[52] U.S. Cl. ............................................................ 73/304 C
[58] Field of Search .................... 73/304 C; 361/284; 340/620; 338/38

[56] References Cited

U.S. PATENT DOCUMENTS

| | | | |
|---|---|---|---|
| 1,172,541 | 2/1916 | McDonnell et al. | |
| 2,766,623 | 10/1956 | De Giers | 73/304 |
| 2,975,637 | 3/1961 | Burdick | 73/304 |
| 3,025,464 | 3/1962 | Bond | 324/61 |
| 3,103,002 | 9/1963 | Pearson | 340/244 |
| 3,930,411 | 1/1976 | Beeker et al. | 73/223 |
| 4,176,553 | 12/1979 | Wood | 73/304 |
| 4,284,343 | 8/1981 | Junghanns | 354/318 |
| 4,383,444 | 5/1983 | Beaman et al. | 73/304 C |
| 4,392,378 | 7/1983 | Pitches et al. | 73/304 C |
| 4,806,847 | 2/1989 | Atherton et al. | 324/61 P |
| 4,924,702 | 5/1990 | Park | 73/304 C |
| 5,001,596 | 3/1991 | Hart | 361/284 |
| 5,051,921 | 9/1991 | Paglione | 73/1.73 |
| 5,103,368 | 4/1992 | Hart | 361/284 |
| 5,191,316 | 3/1993 | Dreyer | 340/621 |
| 5,613,398 | 3/1997 | Lawson | 73/304 C |

OTHER PUBLICATIONS

"RF Capacitive/Admittance Limit Detection Electronic Insert FEC 22", Technical Information TI 251F/00ae/02.96 Brochure by Endress+Hauser.

*Primary Examiner*—William Oen
*Assistant Examiner*—Robin Clark
*Attorney, Agent, or Firm*—Luedeka, Neely & Graham, P.C.

[57] ABSTRACT

A capacitive level detection system provides a highly accurate determination of liquid level within a container. The primary sensor is an elongate capacitive probe positioned vertically within the container so that a lower portion of the probe is in liquid and an upper portion of the probe extends above the surface of the liquid. A capacitive liquid reference sensor is proximate the lower end of the probe, and a capacitive gas reference sensor is proximate the upper end of the probe. A controller is provided for driving each of the sensors with an electrical signal and reading a resultant value corresponding to the capacitance of each of the sensors. The controller is configured to enable the system to be calibrated prior to installation by placing each of the sensors in a calibration or identical medium, reading sensor values corresponding to capacitances for each of the sensors, and calculating and storing calibration values based on the sensor values. Following installation, values read from each of the sensors are mathematically combined with the stored calibration values to determine liquid level within the container. Liquid level setpoints can also be programmed into the controller by a user to control liquid level within the container.

13 Claims, 7 Drawing Sheets

CAPACITIVE LEVEL SENSOR AND CONTROL SYSTEM

TECHNICAL FIELD

The present invention relates generally to devices for sensing the level of a contained medium. More particularly, it relates to a capacitive level sensor and control system for monitoring and controlling the level of a contained liquid over a wide range of operating pressures and temperatures.

BACKGROUND

Capacitive-type sensors for measuring the level of fluids have been previously used in the art. In U.S. Pat. No. 4,176,553 to Wood, for example, there is described a capacitive sensor for sensing the level of fuel in an automotive fuel tank. The sensor includes a housing with a plurality of capacitive plates extending in corresponding arms of the housing so as to monitor liquid levels at separate locations. Each plate is coated with an insulating film to prevent shorting of the plates when fuel is present. Each of the capacitors are interrogated to derive separate signals from which a difference signal is determined. The difference signal is then compared with a predetermined maximum difference signal value to determine if the sensed levels correspond to each other within a predetermined allowable difference. If the measured discrepancy is within the maximum allowable amount, an enabling signal is generated which allows one of the capacitors to be read and used to indicate the quantity of fuel remaining in the tank.

As another example, U.S. Pat. No. 5,103,368 to Hart describes a capacitive fluid level sensor which senses level by charging a plurality of capacitors in sequence. The capacitors are formed by two concentric tubes which are vertically oriented in a tank. The vertical orientation allows the fluid to be the dielectric between the plates. As the fluid level falls, a greater area of the plates is exposed to air as the dielectric, which changes the capacitance of the capacitor. For irregular shaped tanks, the capacitors are arranged in a non-linear manner. After each capacitor is charged for a fixed time interval, the resultant voltage is compared with a known voltage to obtain an output signal representing liquid depth.

The readings obtained from prior art capacitive-type sensors are subject to variation and inaccuracies based on a number of variables. For example, a change in the dielectric constant of either the liquid being measured or the gas above the liquid can significantly effect sensor readings. Pressure and temperature changes of the liquid or gas can result in significant shifts to the dielectric constants of the liquid and gas, which introduces inaccuracies to the sensor readings. Because prior art sensors fail to compensate for such variances and inaccuracies, their usefulness is limited to applications where pressure and temperature (and therefore, dielectric constant) is substantially constant, or where precision is not a requirement. Additionally, many prior art level sensors must be calibrated at the time the sensor is installed for service, thus complicating the sensor's installation and setup.

What is needed, therefore, is a sensor which can consistently measure liquid level with a high degree of accuracy regardless of dielectric changes which may occur in the liquid or gas due to temperature changes, pressure changes, and other changes affecting the dielectric constants. The sensor should be capable of being calibrated at the factory so that calibration need not be performed when the sensor enters service.

SUMMARY

With regard to the foregoing and other objects, the invention in one aspect provides a capacitive level detector and system for detecting the level of a contained liquid. The detector includes three capacitive sensors, including an elongate capacitive probe sensor, a capacitive liquid reference sensor, and a capacitive gas reference sensor. The probe sensor has a first end for being submersed in a contained liquid and a second end positioned above the surface of the liquid. The probe sensor's capacitance varies depending on the extent of the probe's immersion in the liquid and the liquid and gas dielectric constants. The probe sensor has a central axis extending the length of the sensor where the length is defined by the distance between the first and second ends. The liquid reference sensor is positioned adjacent to the first end of the probe sensor and is substantially continuously submersed in the liquid. The liquid reference sensor exhibits a first capacitance when submersed in the liquid and a second capacitance which is different than the first capacitance when exposed to gas above the liquid. The gas reference sensor is positioned adjacent the second end of the probe sensor and is substantially continuously exposed to gas above the liquid. The gas reference sensor exhibits a first capacitance when the sensor is exposed to gas and a second capacitance which is different than the first capacitance when the sensor is submersed in liquid. A controller is connected to each of the sensors to determine the level of the contained liquid based on the capacitances of the sensors. The controller includes a memory for storing ratios of voltages measured from the sensors when each of the sensors are placed in a medium, such as air.

The probe sensor preferably includes two conductive cylinders as the plates of the capacitive sensor. These cylinders include a first conductive cylinder having opposed first and second ends corresponding to the first and second ends of the probe sensor and having a diameter. A second conductive cylinder also has first and second ends corresponding to the first and second ends of the probe sensor with a diameter which is greater than the diameter of the first cylinder. The second conductive cylinder is positioned concentrically about the first conductive cylinder and separated by an annular gap so that the cylinders function as the charged plates of the probe sensor. Fluid within the annular gap functions as the dielectric between that portion of the charged plates with which the fluid is in contact.

The liquid and gas reference sensors each are fabricated as parallel plate capacitors.

The plates are positioned at an angle of about fifteen degrees to the normal of the probe sensor axis so that liquid is more readily drained from between the plates.

Calibration values are preferably determined by the controller in accordance with the following equations:

$$R_{lg} = \frac{V_{lref_{cal}}}{V_{gref_{cal}}} \quad \& \quad R_{gp} = \frac{V_{grep_{cal}}}{V_{probe_{cal}}}, \tag{1}$$

$V_{lref_{cal}}$ is a measured voltage corresponding to the capacitance of the liquid reference sensor when placed in a calibration medium, $V_{gref_{cal}}$ is a measured voltage corresponding to the capacitance of the gas reference sensor when placed in a calibration medium, $V_{probe_{cal}}$ is a measured voltage corresponding to the capacitance of the probe sensor when placed in a calibration medium, $R_{lg}$ is a calibration ratio of the liquid reference sensor capacitance to the gas reference sensor capacitance, and $R_{gp}$ is a calibration ratio of the gas reference sensor capacitance to the probe sensor capacitance.

With $R_{lg}$ and $R_{gp}$ as defined above, liquid level (f) is preferably determined by the controller in accordance with the following equation:

$$f = \frac{R_{lg}(V_{gref} - R_{gp}V_{probe})}{R_{lg}V_{gref} - V_{lref}} \tag{2}$$

where:

f is a fractional liquid level value ranging from "0" (empty) to "1" (full), $V_{gref}$ is a measured voltage corresponding to the capacitance of the gas reference sensor, $V_{lref}$ is a measured voltage corresponding to the capacitance of the liquid reference sensor, and $V_{probe}$ is a measured voltage corresponding to the capacitance of the probe sensor.

Connections between each of the sensors and the controller preferably include a driving line and a return line. The controller includes means for driving each of the driving lines with a voltage to produce a current on each of the return lines corresponding to the sensor's capacitance. Current-to-voltage converters receive the electrical currents and convert them to voltages. The voltages are then digitized by analog-to-digital converters. As described above, a memory within the controller is used for storing calibration values corresponding to sensor capacitances obtainable with each of the sensors submersed in a medium. A microcomputer within the controller receives and processes the digitized sensor voltages and calibration values to determine liquid level.

Further features of the controller may include an indicator for indicating when the contained liquid is at a predetermined level, and a computer interface for allowing the controller to communicate with a peripheral device such as a portable computer.

In accordance with another aspect of the invention, a capacitive level detection and control system is provided to determine and to control the level of a contained liquid. The system includes a capacitive probe and reference sensors as described above, and a controller and flow controlling valve. Preferably, the controller's microcomputer is programmed to determine liquid level in accordance with Equation (2). A storage tank having a top and a bottom is provided to contain the liquid. The probe sensor is positioned with its first end adjacent the tank bottom and the second end of the probe sensor is positioned adjacent the tank top.

The system may further include a supply tank for containing a supply of the liquid. A liquid conduit interconnects the storage tank with the supply tank, and a valve regulates transfer of liquid from the supply tank to the storage tank in response to signals received from the controller.

The controller may also include a user interface connected to the microcomputer for entering user commands and information to control the operation of the system, including specifying one or more liquid level setpoints defining liquid level limits within the storage tank.

The setpoints may include a maximum setpoint defining a maximum acceptable liquid level within the storage tank, a minimum setpoint defining a minimum acceptable liquid level within the storage tank, a first intermediate setpoint defining a minimum desirable liquid level, and a second intermediate setpoint defining a maximum desirable liquid level. When liquid level within the storage tank reaches the first intermediate setpoint, the controller opens the valve so that liquid is transferred from the supply tank to the storage tank. When the second intermediate setpoint is reached, the controller causes the valve to close so that liquid transfer ceases. One or more indicators may be provided on the controller to indicate to a user when liquid level setpoints are reached.

The present invention also provides at least two methods for determining the level of a liquid within a container. The first method includes the steps of positioning a capacitive probe sensor having an upper end and a lower end within a container of liquid so that the lower end of the probe sensor is submersed in liquid and the upper end extends above the surface of the liquid with the liquid surface being at a level between the upper and lower ends of the probe sensor. A capacitive liquid reference sensor is positioned proximate the lower end of the probe sensor so that the liquid reference sensor is submersed within the liquid. A capacitive gas reference sensor is positioned proximate the upper end of the probe sensor so that the gas reference sensor is above the surface of the liquid. The level of the liquid is then calculated in accordance with Equation (2) given above.

In accordance with a second method of determining the level of a liquid within a container, a capacitive probe sensor, a capacitive liquid reference sensor, and a capacitive gas reference sensor are provided. A first calibration value ($R_{lg}$) is calculated from values corresponding to capacitances of the liquid reference sensor and the gas reference sensor when both reference sensors are placed in a calibration or identical medium. A second calibration value ($R_{gp}$) is calculated from values corresponding to the gas reference and probe sensors when both of these sensors are placed in the medium. Each of the first and second calibration values are stored. The probe and reference sensors are positioned within the container as described above, and values corresponding to sensor capacitances are measured for each of the sensors, including a probe sensor value ($V_{probe}$), a liquid reference sensor value ($V_{lref}$), and a gas reference sensor value ($V_{gref}$). The level of the liquid within the container is then determined in accordance with Equation (2).

BRIEF DESCRIPTION OF THE DRAWINGS

The above and other features, aspects and advantages of the present invention will now be discussed in the following detailed description and appended claims considered in conjunction with the accompanying drawings in which:

DETAILED DESCRIPTION OF A PREFERRED EMBODIMENT

Figure 1:
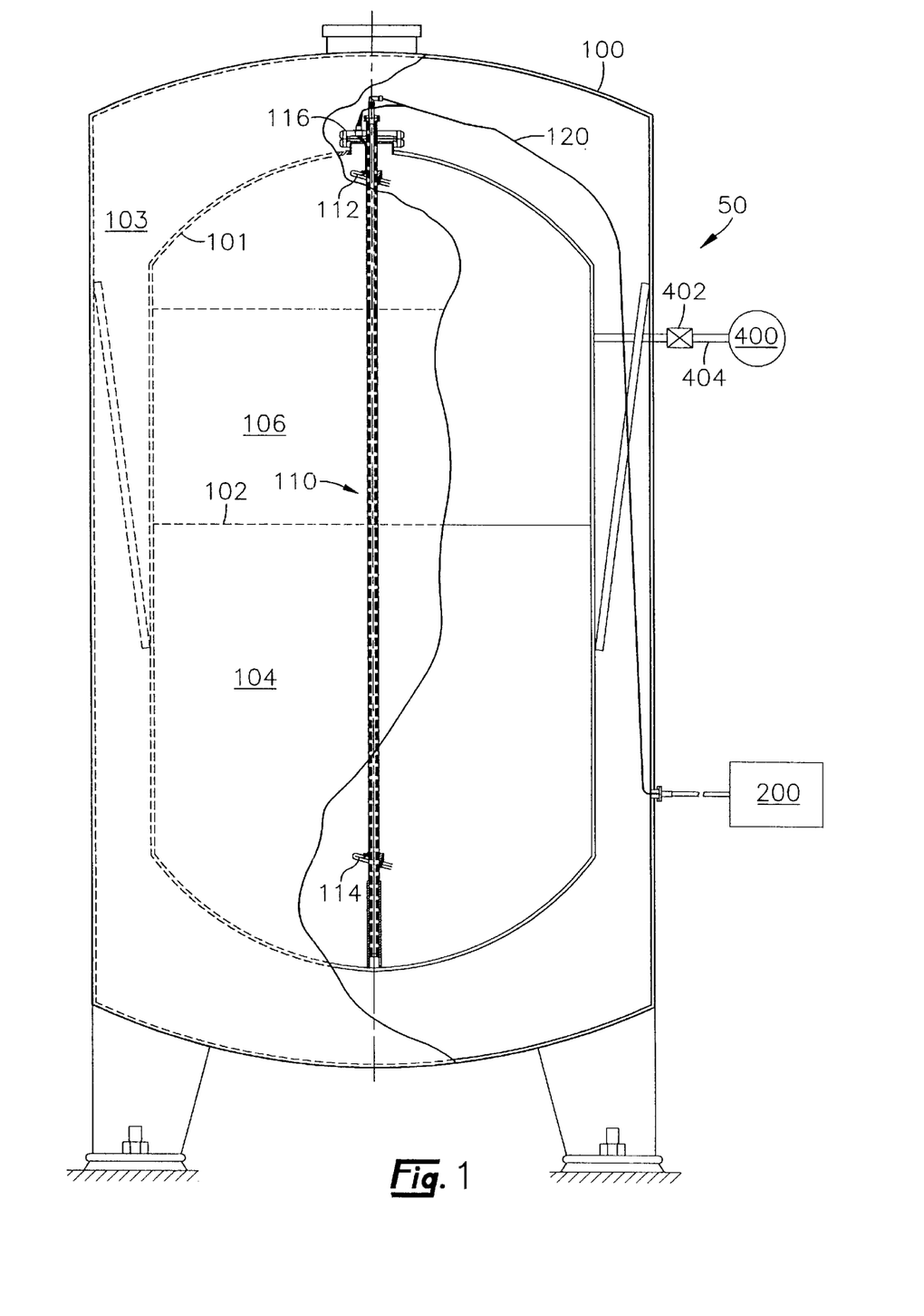
FIG. 1 is a diagrammatical drawing of a liquid level sensor and control system in accordance with the invention, including a continuous capacitive sensor, a gas reference sensor, and a liquid reference sensor positioned within a vacuum insulated tank containing a cryogenic liquid.

With reference now to the drawings in which like reference characters designate like or similar parts throughout the several views, FIG. 1 illustrates an exemplary application of a liquid level sensor and control system 50 in accordance with the present invention. As shown in FIG. 1, a vacuum jacketed cryogenic storage tank 100 is used to store cryogenic liquids such as liquid oxygen, liquid nitrogen, liquid hydrogen, or other cryogenic liquids. The inner wall 101 of the tank is surrounded by a vacuum jacket 103 which serves to thermally isolate the liquid 104 being stored. The storage tank 100 is shown filled to line 102, which represents the liquid surface 102 separating the liquid 104 from the gas 106 which is present in the tank 100 above the liquid 104. Positioned within the storage tank 100 is an elongate "continuous" capacitive probe, or primary sensor 110 which provides an output in the form of a capacitance corresponding to the extent of submersion of the primary sensor 110 in the liquid 104, and hence, the level of the liquid 104. Two capacitive reference sensors, a gas reference sensor 112 and a liquid reference sensor 114, are positioned adjacent the top and bottom, respectively, of the primary sensor 110 to assist in calibration of the system 50 and to provide capacitances proportional to liquid and gas dielectric constants, as more fully described below. The capacitances of the primary sensor 110 and reference sensors 112, 114 are read via lines 119 by a controller 200 which determines level based on the sensor readings.

Figure 2:
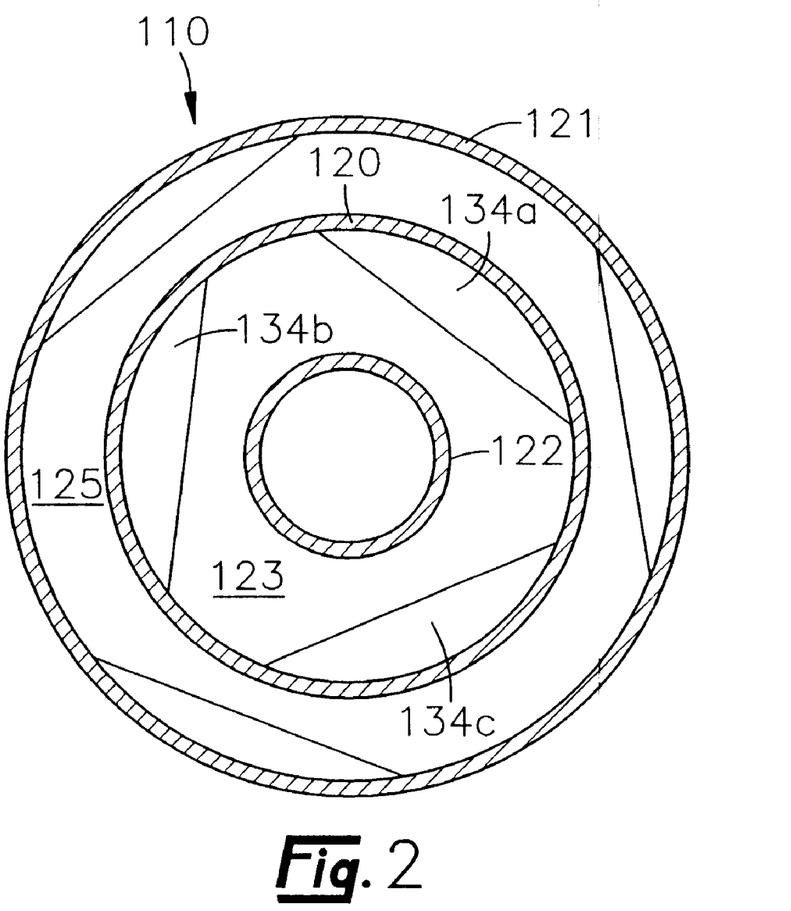
FIG. 2 is a cross-sectional view of the continuous capacitive sensor shown in FIG. 1.

In a preferred embodiment, the primary sensor 110 is configured as two conductive tubes concentrically positioned in a spaced apart relation to one another. FIG. 2 shows a cross-sectional view of the primary sensor 110 in which the outer tube 120 is concentrically positioned about the inner tube 122, the diameter of the inner tube 122 being less than the diameter of the outer tube 120. Installation is simplified by placing the two conductive tubes 120, 122 of the primary sensor 110 within an outer support tube 121. The spacing between the conductive tubes 120, 122 should be sufficient to enable the liquid 104 between the tubes 120, 122 to rise and fall at substantially the same rate at which the liquid level 102 within the tank 100 changes, considering the effects of surface tension, viscosity, and other parameters affecting the flow of liquid 104 between the conductive tubes 120, 122. Spacers 123, 125 made of a nonconductive material such as Teflon™ are used to maintain separation and electrical isolation between each of the tubes 120–122. Each conductive tube 120, 122 is preferably fabricated as a continuous conductive element, such as a tube which is made of stainless steel, so that the primary sensor 110 functions as a single capacitive sensor.

Figure 3:
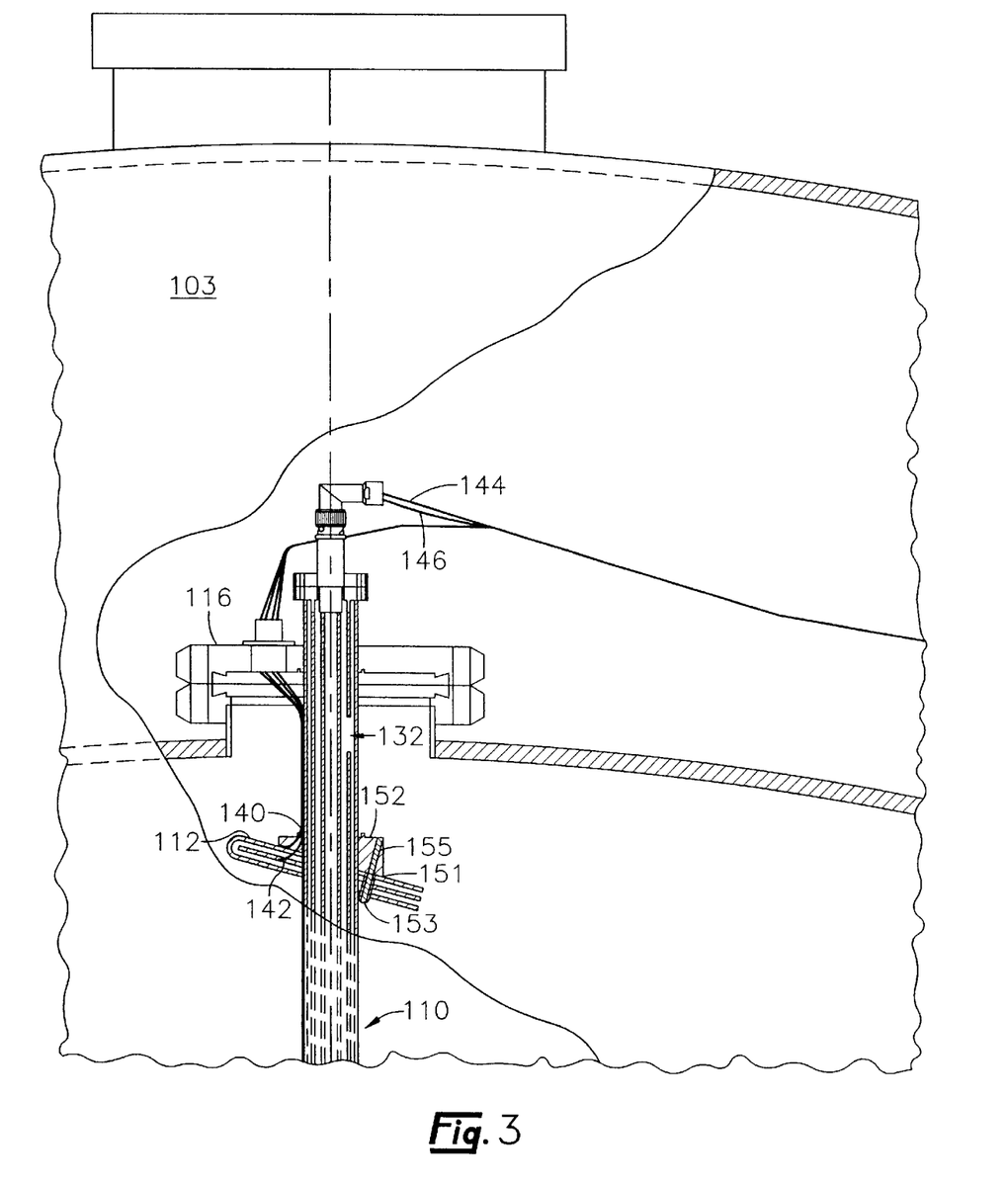
FIG. 3 is a sectional view of the top portion of the tank of FIG. 1 showing a preferred way of securing the continuous sensor to the top of the tank.

As shown in the sectional view of FIG. 3, a support bracket 116 is used to support and position the upper end of the primary sensor 110 in the tank 100. The upper end of the sensor 110 is preferably rigidly attached to the support bracket 116. For purposes of maintaining the insulative integrity of the vacuum jacket 103 surrounding the fluid containment wall 101, the sensor 110 and bracket 116 interface is preferably sealed or otherwise closed to prevent gas 106 from escaping into the vacuum jacket 103.

Figure 4:
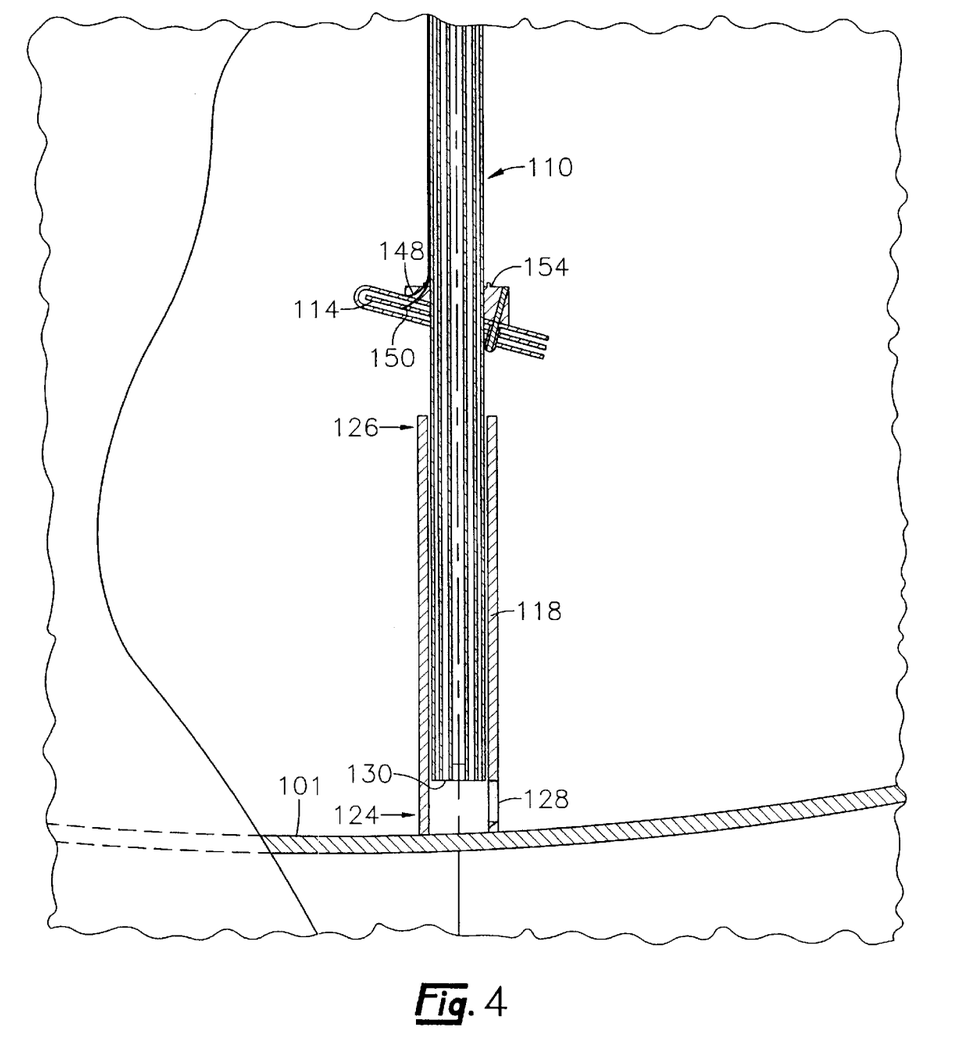
FIG. 4 is a section view of the bottom portion of the tank of FIG. 1 showing how the bottom of the continuous sensor is preferably secured.

The lower end of the primary sensor 110 is supported by a lower support 118 as shown in the sectional view of FIG. 4. In a preferred embodiment, the lower support 118 is configured as a tube, the inner diameter of which is slightly greater than the diameter of the outer support tube 121, thereby enabling the lower end of the primary sensor 110/outer support tube 121 arrangement to fit within the lower support 118. An attachment end 124 of the lower support 118 is attached to the bottom portion of the tank's inner wall 101 so that the support 118 is vertically oriented within the tank 100. The upper end 126 of the support 118 is open and positioned to receive a lower portion of the primary sensor 110 so that the combination of the upper support bracket 116 and lower support 118 secures the primary sensor 110 and outer support tube 121 within the storage tank 100 as shown in FIG. 1. In an alternate embodiment, the outer support tube 121 is rigidly attached to or connected with the bottom portion of the tank 100. In this alternate embodiment, a bracket may be used to rigidly interconnect the lower end of the outer support tube 121 with the bottom portion of the tank 100.

With continued reference to FIG. 4, the lower support 118 includes an opening 128 through which liquid 104 enters. The primary sensor 110 includes two openings to the space 130 between tubes 120, 122—one opening 130 at the lower end of the primary sensor 110 and the other opening 132 (FIG. 3) positioned at the upper end of conductive tube 120. In combination, these openings 128–132 enable fluid, including liquid 104 and gas 106, to freely flow between conductive tubes 120, 122 and past the spacers 123 (through openings 134a–c) as the liquid level 102 rises and falls in the storage tank 100. In this manner, the fluid serves as a dielectric between the tubes 120, 122 for that portion of the tubes 120, 122 which is submersed below the surface 102. Above the surface 102, gas 106 serves as the dielectric between the tubes 120, 122. Since the gas 106 in the tank 100 generally exhibits a lower dielectric constant than the cryogenic liquid 104, the capacitance of the primary sensor 110 is representative of the point at which the dielectric shift occurs (i.e., at the surface 102). In other words, the dielectric constant of the fluid present within space 130 affects the capacitance of the primary sensor 110, and as the level 102 of the liquid 104 within the tank 100 changes, the capacitance of the primary sensor 110 changes substantially linearly with liquid level 102.

In a preferred embodiment, the system 50 is employed to measure fluids which are substantially nonconductive so that the system 50 senses capacitances and not resistances. Accordingly, a preferred application of the system 50 is where the system 50 is employed to measure fluids which exhibit a dielectric constant of about 10 or less. For fluids which are substantially conductive, an insulative coating (such as Teflon™ coating provided by E.I. DuPont de Nemours & Co. of Wilmington, Del.) is applied to the plates and tubes of the sensors 110–114 to prevent the sensors 110–114 from discharging through the conductive fluid.

The gas reference sensor 112 is positioned adjacent the upper end of the primary sensor 110 so that the sensor 112 is positioned above the liquid surface 102 within the gas 106. In a preferred embodiment, a hub 152 is attached to the outer tube 121 and the gas reference sensor 112 is attached to the hub 152. The gas reference sensor 112 is preferably fabricated from three circularly-shaped, parallel plate pairs with the two outer plates being electrically connected. In a preferred embodiment, each plate is about 3.0 inches in diameter and slanted at an angle between about 5–15 degrees. Slanting the sensor's plates enhances drainage of liquid from the plates should the sensor 112 somehow come in contact with the liquid 104.

The gas reference sensor 112 is electrically isolated from the hub 152. To electrically isolate the sensor 112 from the hub 152, a disc 151 made of Teflon™ is used as an insulator between hub 152 and sensor 112. A Teflon™ sleeve 153 is used to maintain electrical isolation between the sensor plates and a post 155 which secures each of the sensor plates to the hub 152 in a spaced apart relation. Teflon™ is chosen as the preferred insulation material because Teflon™ is a good electrical insulator and also maintains structural integrity when exposed to the extremely low temperature conditions within the storage tank 100.

The liquid reference sensor 114 is also preferably made of three circularly-shaped, parallel plate pairs, slanted at an angle between about 5–15 degrees, and attached to a hub 154 which is attached to the lower end of the outer tube 121 so that the liquid reference sensor 114 is always submersed within the liquid 104. Like the gas reference sensor 112, the liquid reference sensor 114 is electrically isolated from hub 154 by Teflon™.

To enable the controller 200 to read the capacitance of the primary sensor 110, lead wires 144, 146 are interconnected to the outer and inner tubes 120, 122, respectively, and the controller 200. To determine the capacitances of the reference sensors 112, 114, the controller 200 is connected by lead wires 140, 142 (FIG. 3) to the parallel plates of the gas reference sensor 112 and the controller 200 is connected by lead wires 148, 150 (FIG. 4) to the parallel plates of the liquid reference sensor 114. In a preferred embodiment, all lead wires interconnecting the sensors 110–114 with the controller 200 are coaxial cables.

Figure 5:
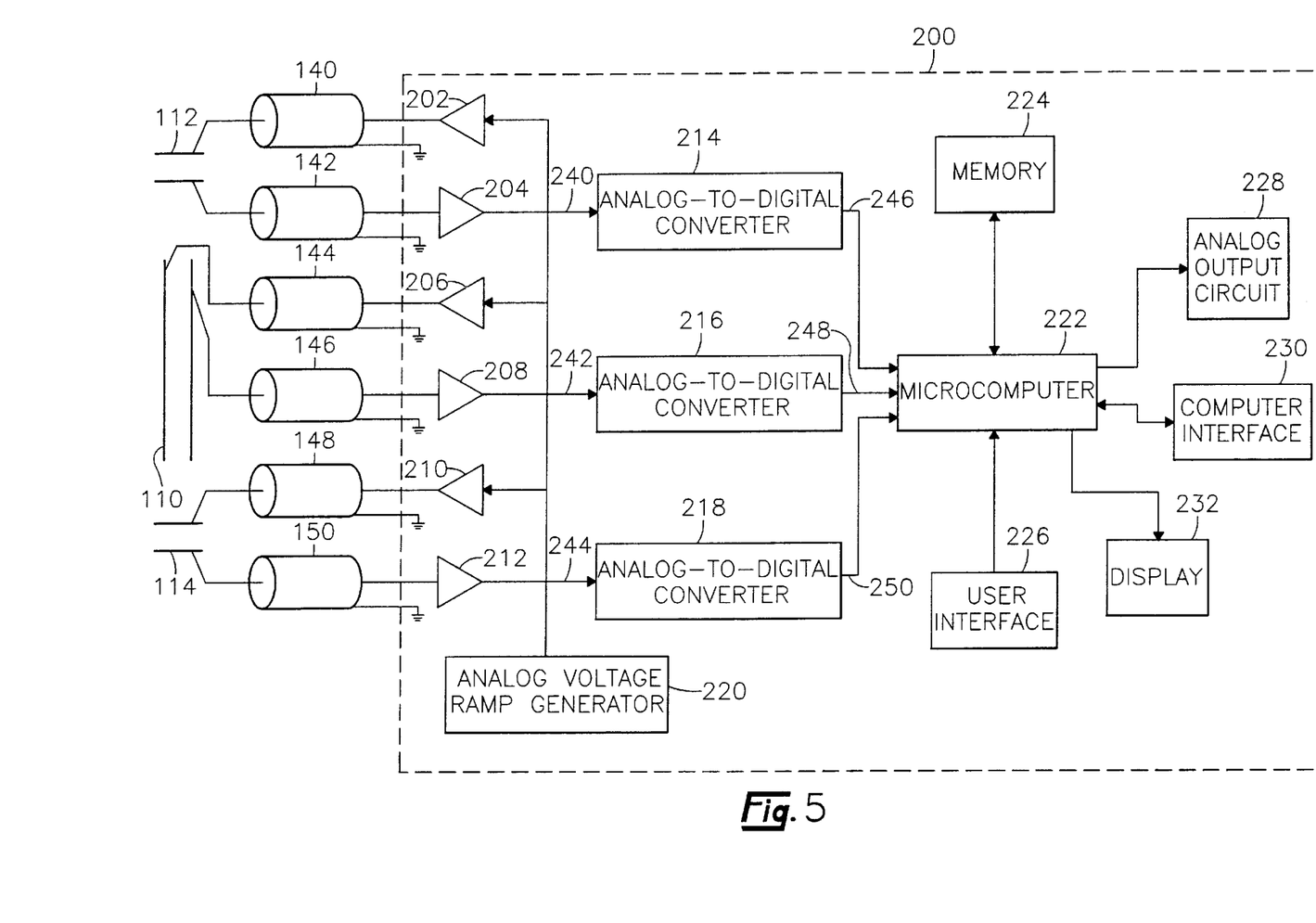
FIG. 5 is a functional block diagram showing connections between the capacitive sensors of FIG. 1 and a controller in accordance with the invention.
Figure 6:
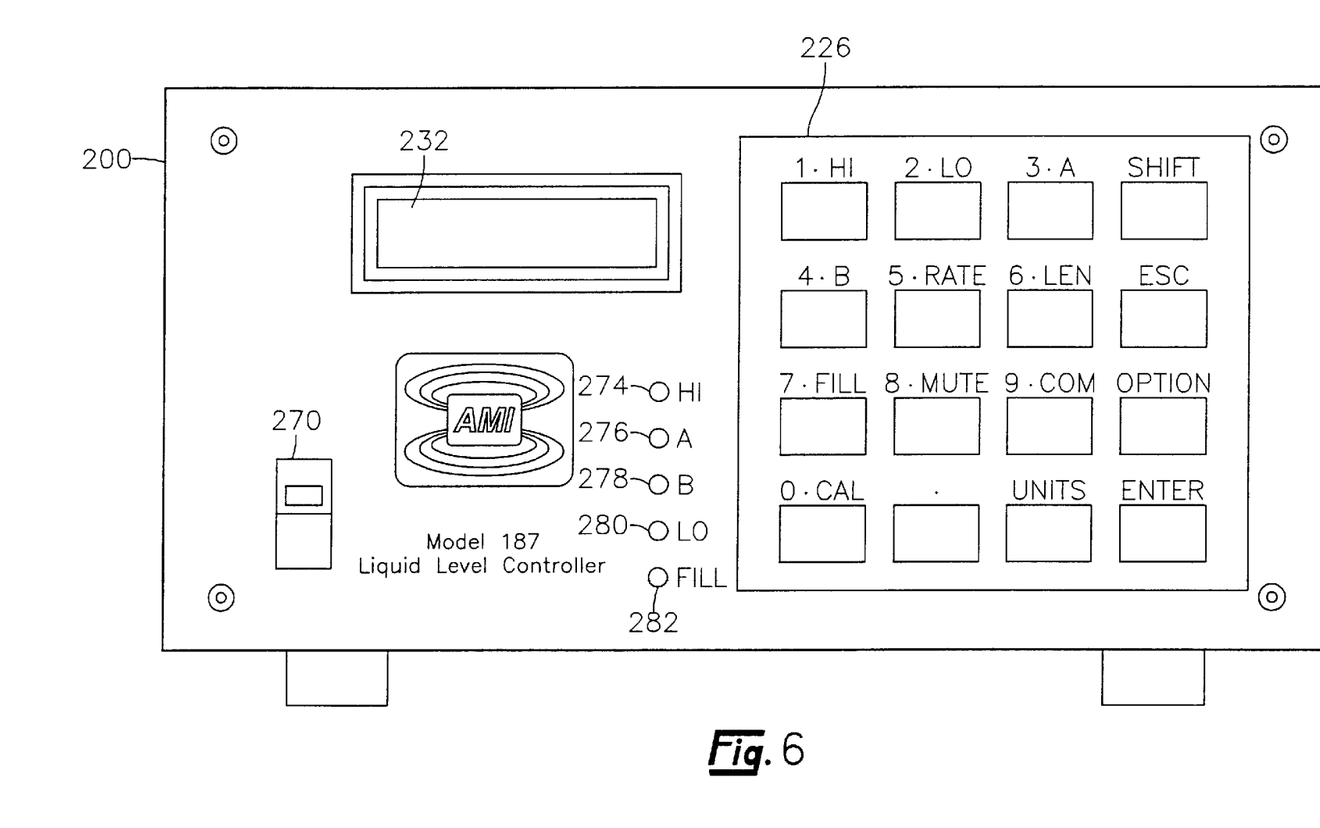
FIG. 6 is a front view of the controller of FIG. 5.

As shown in the functional block diagram of FIG. 5, the controller 200 includes an analog voltage ramp generator 220, capacitive sensor drivers 202, 206, 210, current-to-voltage converters 204, 208, 212, analog-to-digital converters 214, 216, 218, a microcomputer 222, electronic memory 224, a user interface 226, and a display 232. A computer interface 230 (such as an IEEE 488, RS-232, or RS-422) or an analog output device 228 providing digital-to-analog conversion of output signals, or both, may be included to enable the controller 200 to communicate with a peripheral device such as a portable computer. Various external features of the controller 200 are shown in FIG. 6. The features shown in FIG. 6 include a power switch 270 for turning the controller ON and OFF, a 16-key keypad, or user interface 226, and a 16 character ×2 line LCD backlit display 232. The user interface 226 can be used to define liquid level 102 and setpoint indication (described below) in inches, centimeters, or percent as selected by the user. User information, including liquid level 102 and setpoint indications, is provided to the user on display 232.

Several LEDs are also provided on the front of the controller 200 to indicate the status of various control and alarm setpoints which are adjustable through the user interface 226. These setpoints include two alarm setpoints (HI and LO) which define maximum and minimum acceptable liquid levels within the storage tank 100, and two control setpoints (A and B) which define intermediate, or desirable liquid levels used for controlling liquid level 102 automatically through use of a fill valve 402, which is preferably a solenoid-operated valve, and liquid conduit 404 interconnecting the tank 100 with a liquid supply source, or tank 400. When the HI alarm setpoint is reached, a HI level LED 274 is illuminated. Likewise, a LO level LED 280 is illuminated when liquid level 102 reaches the LO alarm setpoint. The A level LED 276 illuminates when liquid level 102 reaches that level defined by control setpoint A, and B level LED 278 illuminates when control setpoint B is reached. When setpoint B is reached, the microcomputer 222 outputs a signal to the fill valve 402 so that the valve 402 opens to allow liquid to flow from the supply tank 400 to the storage tank 100. When the storage tank 100 has filled to the level defined by setpoint A, the fill valve 402 closes and liquid flow into the storage tank 100 ceases. A FILL LED 282 is illuminated to indicate when the solenoid-operated fill valve 402 is open and allowing liquid to flow from supply tank 400 into the tank 100. This automatic FILL function provided by the controller 200 can be manually overridden or disabled through the user interface 226.

With continued reference to FIG. 5, the operation of a preferred embodiment of the controller 200 will now be described in detail. The analog voltage ramp generator 220 generates a very repeatable and stable dV/dt. This dV/dt is fed into the three capacitive sensor drivers 202–210, which are implemented as unity-gain amplifiers designed to be stable while driving a load which exhibits some measure of capacitance. Each of the three capacitive sensor drivers 202–210 drive one end of the center conductor of a coaxial cable 140, 144, 148, the shield of each being connected to the controller circuit common. At the sensor end of each of these "driving" coaxial cables, the center conductor is connected to one plate of one of the sensors 110–114. For example, the center conductor of cable 140 is connected to one plate of the gas reference sensor 112, the center conductor of cable 148 is connected to one plate of the liquid reference sensor 114, and the center conductor of cable 144 is connected to one plate (preferably the outer tube 120) of the primary sensor 110. The shield at the sensor end of each driving coaxial cable 140, 144, 148 is left unterminated.

The center conductor at the sensor end of each of three "receiving" coaxial cables 142, 146, 150 is connected to the undriven plates of the sensors 110-114. Specifically, the center conductor of cable 142 is connected to the undriven plate of the gas reference sensor 112, the center conductor of cable 150 is connected to the undriven plate of the liquid reference sensor 114, and the center conductor of cable 146 is connected to the undriven plate, or inner tube 122 of the primary sensor 110. The shield at the sensor end of each these three "receiving" coaxial cables is left unterminated.

Figure 7A:
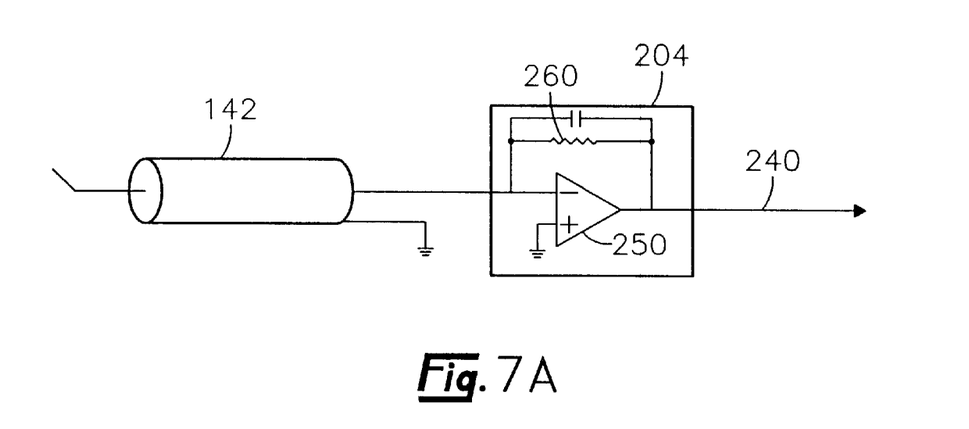
FIGS. 7A–C are schematic diagrams of voltage-to-current converters contained in the controller of FIG. 5.
Figure 7B:
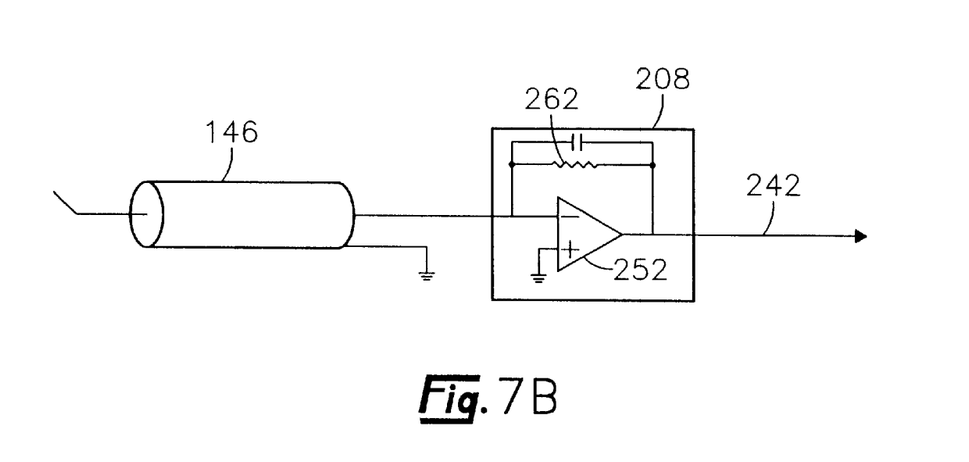
Figure 7C:
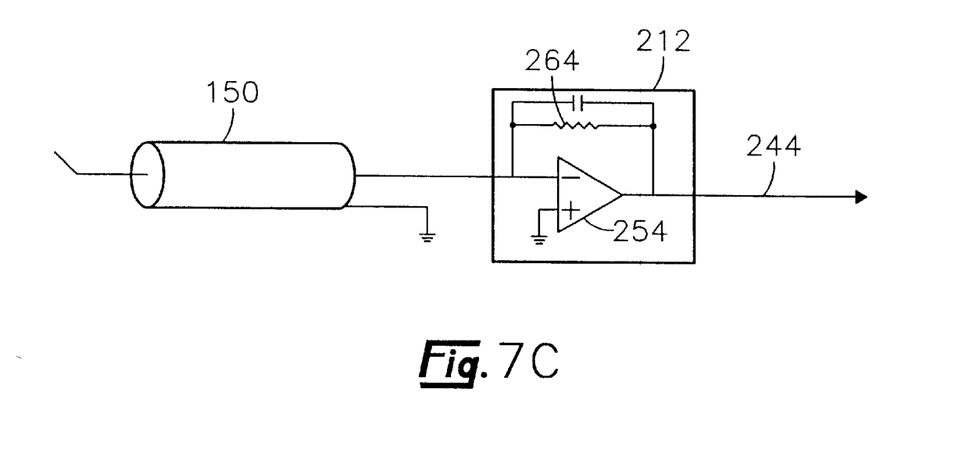

At the controller end of each of the receiving coaxial cables 142, 146, 150 the shield is connected to controller circuit common and the center conductor is connected to one of the current-to-voltage converters 204, 208, 212. FIG. 7A shows the connection between the center conductor of cable 142 and converter 204, FIG. 7B shows the connection between the center conductor of cable 146 and converter 208, and FIG. 7C shows the connection between the center conductor of cable 150 and converter 212. As FIGS. 7A–C illustrate, each of the three current-to-voltage converters 204–212 includes an operational amplifier 250, 252, 254 and a resistor 260, 262, 264 interconnected between the amplifier's output and its inverting input.

The center conductor of each receiving coaxial cable 142, 146, 150 is connected to the inverting input of an operational amplifier. The noninverting input of each of the receiving end operational amplifiers 250–254 is connected to controller circuit common. Each of the three current-to-voltage converters 204–212 includes a resistor interconnected between the operational amplifier's output and its inverting input. Configured in this manner, the three receiving end operational amplifiers 250-254 function as the current-to-voltage converters 204–212 which receive current that is output by each of the receiving cables 142, 146, and 150 and convert the current to a voltage which is output on lines 240, 242, and 244, respectively.

By connecting the shields of all cables to controller circuit common, the center conductors of cables 142, 146, and 150 are doubly shielded from the voltage ramp on the center conductor of cables 140, 144, and 148. Thus, the current which flows into each current-to-voltage converter 204–212 is substantially a function of only the capacitive sensor, and not of the cable capacitance. This makes the installation, calibration, and use of the system 50 much simpler for the end user and much more accurate over temperature and pressure variations, since the end user does not have to "calibrate out" the cable capacitance. Additionally, the system 50 prevents cable capacitance variations caused by temperature and pressure variations from introducing shifts in the measured capacitance, which would otherwise introduce errors in the measurement.

The output 240–244 from each current-to-voltage converter 204, 208, 212 is routed to an analog-to-digital converter 214, 216, 218 where the signal is converted from analog to digital format and output on lines 246, 248, 250. A circuit synchronized to the analog dV/dt ramp generator 220 initiates analog-to-digital conversions during the stable dV/dt time, and not during the "flyback" time of the ramp generator 220. The digital values resulting from the analog-to-digital conversions of the three sensor signals on lines 246–250 are mathematically manipulated by the microcomputer 222 (as described below), along with the digitized conversion values taken during calibration (also described below), by the microcomputer 222 to determine a fractional liquid level (see Equation 20 below) representing that portion of the primary sensor 110 which is immersed in liquid 104 relative to that portion which is exposed to gas 106.

Microcomputer 222 is programmed to receive user commands and data from user interface 226 for system calibration and setup, and to control the overall operation of the system 50. The microcomputer 222 receives the digitized sensor signals on lines 246–250 and uses these signals to mathematically determine liquid level (f) in accordance with the following set of equations.

The capacitance of the primary sensor 110 (i.e., the "probe") and each of the reference sensors 112, 114 can be determined from the following equations:

$$C_{probe} = K_p[\epsilon_l f + \epsilon_g(1-f)] \quad (3)$$

$$C_{lref} = K_l \epsilon_l \quad (4)$$

$$C_{gref} = K_g \epsilon_g \quad (5)$$

where:

$C_{probe}$ is a measured capacitance from primary sensor 110, $C_{lref}$ is a measured capacitance from liquid reference sensor 114, $C_{gref}$ is a measured capacitance from gas reference sensor 112, $K_p$ is a mechanical conversion factor for primary sensor 110, $K_l$ is a mechanical conversion factor for liquid reference sensor 114, $\epsilon_l$ is a dielectric of liquid 104, $\epsilon_g$ is a dielectric of gas 106, and f is a fractional liquid level 102 (0 for empty tank, 1 for full tank).

The mechanical conversion factors shown in Equations 3–5 account for geometrical variations between the sensing elements, including the spacing between the plates of the sensors, plate surface areas, and other geometrical variations.

Solving Equations 3–5 for f and eliminating the dielectric values yields:

$$f = \frac{K_l(C_{gref}K_p) - C_{probe}K_g)}{K_p(C_{gref}K_l - C_{lref}K_g)} \quad (6)$$

As previously described, the controller 200 is programmed to determine values, preferably voltages, corresponding to the capacitances of each of the sensors 110–114. To convert the voltage measurements to capacitance values, the controller 200 relates capacitance values to the measured voltages. Since the measured capacitance range for the primary sensor 110 and each reference sensor 112, 114 may not be identical, a gain value (G) is associated with each sensor. In a preferred embodiment, the gain value is designed into the specific measurement circuit, as described below, for the particular application. The relationship between the capacitances, voltages, and gains for each sensor is then defined as:

$$C_{probe} = \frac{V_{probe}}{G_p} \quad (7)$$

$$C_{lref} = \frac{V_{lref}}{G_l} \quad (8)$$

$$C_{gref} = \frac{V_{gref}}{G_g} \quad (9)$$

where:

$V_{probe}$ is a measured voltage corresponding to the capacitance of the primary sensor 110, $V_{lref}$ is a measured voltage corresponding to the capacitance of the liquid reference sensor 114, $V_{gref}$ is a measured voltage corresponding to the capacitance of the gas reference sensor 112, $G_p$ is a gain factor for primary sensor 110, $G_l$ is a gain factor for liquid reference sensor 114, and $G_g$ is a gain factor for gas reference sensor 112.

Substituting equations (7), (8), and (9) into equation (6) yields:

$$f = \frac{G_l K_l(G_p K_p V_{gref} - G_g K_g V_{probe})}{G_p K_p(G_l K_l V_{gref} - G_g K_g V_{lref})} \quad (10)$$

Equation (10) can be rewritten in the following form:

$$f = \frac{\left[\frac{G_l K_l}{G_g K_g}\right]\left(V_{gref} - \left[\frac{G_g K_g}{G_p K_p}\right]V_{probe}\right)}{\left[\frac{G_l K_l}{G_g K_g}\right]V_{gref} - V_{lref}} \quad (11)$$

Although the system 50 may be calibrated at any time, in a preferred embodiment the system 50 is calibrated once at the factory and is ready for immediate use following installation so that no user calibration procedure is needed during installation. At calibration, the primary sensor 110 and reference sensors 112, 114 are placed in a medium, which is preferably air. Therefore, at calibration the dielectric constants for each sensor are substantially equal (e.g., $\epsilon_l = \epsilon_g = \epsilon_{air}$). The capacitances for the primary sensor 110 (probe) and each reference sensor 112, 114 (reference) can then be defined at calibration as:

$$C_{probe_{cal}} = K_p \epsilon_{air} \quad (12)$$

$$C_{lref_{cal}} = K_l \epsilon_{air} \quad (13)$$

$$C_{gref_{cal}} = K_g \epsilon_{air} \quad (14)$$

The measured voltages (V) are related to the capacitances (C) by gain factors (G) for the primary sensor 110 and each reference sensor 112, 114 by the following equations:

$$V_{probe_{cal}} = G_p K_p \epsilon_{air} \quad (15)$$

$$V_{lref_{cal}} = G_l K_l \epsilon_{air} \quad (16)$$

$$V_{gref_{cal}} = G_g K_g \epsilon_{air} \quad (17)$$

From Equations 15–17, calibration values $R_{lg}$ and $R_{gp}$ can be defined. $R_{lg}$ defines a calibration value of the liquid reference sensor capacitance to the gas reference sensor capacitance. $R_{gp}$ defines a calibration value of the gas reference sensor capacitance to the capacitance of the primary sensor 110. These calibration values are given by the following equations:

$$R_{lg} = \frac{V_{lref_{cal}}}{V_{gref_{cal}}} = \frac{G_l K_l}{G_g K_g} \quad (18)$$

$$R_{gp} = \frac{V_{gref_{cal}}}{V_{probe_{cal}}} = \frac{G_g K_g}{G_p K_p} \quad (19)$$

The calibration values $R_{lg}$ and $R_{gp}$ are determined by Equations (18) and (19) during calibration and stored in nonvolatile memory 224 within the controller 200.

Using the values $R_{lg}$, $R_{gp}$ obtained at calibration, the fractional liquid level (f) from Equation (11) can now be written as:

$$f = \frac{R_{lg}(V_{gref} - R_{gp} V_{probe})}{R_{lg} V_{gref} - V_{lref}} \quad (20)$$

From Equations (18) and (19), it can be seen that calibration of the system 50 only requires that the voltages from the primary sensor 110 and each reference sensor 112, 114 be measured when the sensors are placed within the same medium or in different media having substantially the same dielectric constants. With the calibration ratios $R_{lg}$ and $R_{gp}$ stored in memory 224, the level of the liquid 104 in the tank 100 is easily determined from Equation (20) by the controller 200 from the voltage readings of the primary sensor 110 ($V_{probe}$) and each of the reference sensors 112, 114 ($V_{lref}$, $V_{gref}$). Any dielectric shifts in either the gas 106 or liquid 104 are inherently compensated for within Equation (20), resulting in a highly accurate determination of the fractional liquid level for a wide range of operating conditions.

In operation, the controller 200 is preferably programmed to automatically obtain sensor readings and calculate level 102 substantially continuously. After power up of the controller 200, calibration values which were earlier obtained from Equations (18) and (19) are recovered from memory 224 and the measurement/input loop is initiated. Sensor voltages are determined and liquid level 102 is calculated by the controller 200. If user input is received through the user interface 226, the controller 200 responds to the user input before updating the display 232 with the most recent level calculations. After the display is updated, the next measurement/input loop is automatically initiated.

It is contemplated, and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

What is claimed is:

1. A capacitive level detector for detecting the level of a contained liquid, the detector comprising:

an elongate capacitive probe sensor having a first end for being submersed in a contained liquid and a second end for being positioned above the surface of said liquid, said probe sensor having a capacitance corresponding to the extent of the probe's immersion in the liquid, and having a central axis extending the length of said sensor, wherein said length is defined by the distance between the first and second ends;

a capacitive liquid reference sensor adjacent the first end of said probe sensor, said liquid reference sensor for being substantially continuously submersed in the contained liquid and having a first capacitance when the sensor is submersed in the liquid and a second capacitance which is different from the first capacitance when the sensor is exposed to gas;

a capacitive gas reference sensor adjacent the second end of said probe sensor, said gas reference sensor for being substantially continuously exposed to the gas above the surface of the contained liquid and having a first capacitance when the sensor is exposed to gas and a second capacitance which is different from the first capacitance when the sensor is submersed in liquid; and a controller connected to said probe sensor and said reference sensors to determine level based on the capacitances of the sensors, said controller having a memory for storing calibration values corresponding to capacitances of said sensors when placed in a calibration or identical medium, wherein said calibration values are determined by the controller in accordance with the following equations:

$$R_{lg} = \frac{V_{lref_{cal}}}{V_{gref_{cal}}} \quad \& \quad R_{gp} = \frac{V_{gref_{cal}}}{V_{probe_{cal}}},$$

where:

$V_{lref_{cal}}$ is a measured voltage corresponding to the capacitance of the liquid reference sensor when placed in the calibration or identical medium, $V_{gref_{cal}}$ is a measured voltage corresponding to the capacitance of the gas reference sensor when placed in the calibration or identical medium, $V_{probe_{cal}}$ is a measured voltage corresponding to the capacitance of the probe sensor when placed in the calibration or identical medium, $R_{lg}$ is a calibration ratio of the liquid reference sensor capacitance to the gas reference sensor capacitance, and $R_{gp}$ is a calibration ratio of the gas reference sensor capacitance to the probe sensor capacitance.

2. A capacitive level detector for detecting the level of a contained liquid, the detector comprising:

an elongate capacitive probe sensor having a first end for being submersed in a contained liquid and a second end for being positioned above the surface of said liquid, said probe sensor having a capacitance corresponding to the extent of the probe's immersion in the liquid, and having a central axis extending the length of said sensor, wherein said length is defined by the distance between the first and second ends;

a capacitive liquid reference sensor adjacent the first end of said probe sensor, said liquid reference sensor for being substantially continuously submersed in the contained liquid and having a first capacitance when the sensor is submersed in the liquid and a second capacitance which is different from the first capacitance when the sensor is exposed to gas;

a capacitive gas reference sensor adjacent the second end of said probe sensor, said gas reference sensor for being substantially continuously eased to the gas above the surface of the contained liquid and having a first capacitance when the sensor is exposed to gas and a second capacitance which is different from the first capacitance when the sensor is submersed in liquid; and a controller connected to said sensor and said reference sensors to determine level based on the capacitances of the sensors, said controller having a memory for storing calibration values corresponding to capacitances of said sensors when placed in a calibration or identical medium, wherein said controller is operable to determine liquid level (f) in accordance with the following equation:

$$f = \frac{R_{lg}(V_{gref} - R_{gp}V_{probe})}{R_{lg}V_{gref} - V_{lref}}$$

where f is a fractional liquid level value ranging from "0" (empty) to "1" (full), $V_{gref}$ is a measured voltage corresponding to the capacitance of the gas reference sensor, $V_{lref}$ is a measured voltage corresponding to the capacitance of the liquid reference sensor, $V_{probe}$ is a measured voltage corresponding to the capacitance of the probe sensor, $R_{lg}$ is a calibration ratio of the liquid reference sensor capacitance to the gas reference sensor capacitance, and $R_{gp}$ is a calibration ratio of the gas reference sensor capacitance to the probe sensor capacitance.

3. A liquid level detection system for determining the level of a contained liquid, the system comprising:

a continuous capacitive probe sensor having a first end for being submersed in a contained liquid and a second end for being positioned above the surface of said liquid, said probe sensor having a capacitance corresponding to the extent of the probe's immersion in the liquid, and having a central axis extending the length of said sensor;

a capacitive liquid reference sensor adjacent the first end of said probe sensor, said liquid reference sensor being substantially continuously submersed in the contained liquid and having a first capacitance when the sensor is submersed in the liquid and a second capacitance which is different from the first capacitance when the sensor is exposed to gas;

a capacitive gas reference sensor adjacent the second end of said probe sensor, said gas reference sensor being substantially continuously exposed to the gas above the surface of the contained liquid and having a first capacitance when the sensor is exposed to gas and a second capacitance which is different from the first capacitance when the sensor is submersed in liquid; and a controller connected to said probe sensor and said reference sensors to determine liquid level in accordance with the following equation:

$$f = \frac{R_{lg}(V_{gref} - R_{gp}V_{probe})}{R_{lg}V_{gref} - V_{lref}}$$

where:

f is a fractional liquid level value ranging from "0" (empty) to "1" (full), $V_{gref}$ is a measured voltage corresponding to the capacitance of the gas reference sensor, $V_{lref}$ is a measured voltage corresponding to the capacitance of the liquid reference sensor, $V_{probe}$ is a measured voltage corresponding to the capacitance of the probe sensor, $R_{lg}$ is a calibration ratio of the liquid reference sensor capacitance to the gas reference sensor capacitance, and $R_{gp}$ is a calibration ratio of the gas reference sensor capacitance to the probe sensor capacitance.

4. The system of claim 3, further comprising:

a probe sensor driving line interconnecting said probe sensor and controller;

a probe sensor return line interconnecting said probe sensor and controller;

a liquid reference sensor driving line interconnecting said liquid reference sensor and controller;

a liquid reference sensor return line interconnecting said liquid reference sensor and controller;

a gas reference sensor driving line interconnecting said gas reference sensor and controller;

a gas reference sensor return line interconnecting said gas reference sensor and controller;

wherein said controller includes;

means for driving each of said driving lines with a voltage to produce a current on each of said return lines corresponding to sensor capacitance;

current-to-voltage converters for receiving the electrical currents from each of the return lines to produce sensor voltages;

analog-to-digital converters for receiving the sensor voltages to produce digitized sensor voltages;

a memory for storing calibration sensor voltages for each of the sensors, said calibration sensor voltages corresponding to digitized sensor voltages obtainable with each of the sensors submersed in a medium; and a microcomputer for receiving and processing said digitized sensor voltages and said calibration sensor voltages to determine liquid level.

5. The system of claim 3 wherein said probe sensor includes:

a first conductive cylinder having opposed first and second ends corresponding to the first and second ends of said probe sensor and having a first diameter; and a second conductive cylinder having opposed first and second ends corresponding to the first and second ends of said probe sensor and having a second diameter which is greater than said first diameter, said second conductive cylinder positioned concentrically about said first conductive cylinder and separated by an annular gap so that said first and second conductive cylinders function as the charged plates of said probe sensor and fluid within the annular gap functions as the dielectric between that portion of the charged plates with which the fluid is in contact.

6. A liquid level detection and control system comprising:

a storage tank for containing a liquid, said storage tank having a top and a bottom;

a continuous capacitive probe sensor having a first end adjacent the tank bottom and a second end adjacent the tank top, said probe sensor having a central axis extending from the first end of the sensor to the second end and having a capacitance corresponding to the extent of the probe's immersion in the liquid;

a capacitive liquid reference sensor adjacent the first end of said probe sensor, said liquid reference sensor being substantially continuously submersed in the contained liquid and having a first capacitance when the sensor is submersed in the liquid and a second capacitance which is different from the first capacitance when the sensor is exposed to gas;

a capacitive gas reference sensor adjacent the second end of said probe sensor, said gas reference sensor being substantially continuously exposed to the gas above the surface of the contained liquid and having a first capacitance when the sensor is exposed to gas and a second capacitance which is different from the first capacitance when the sensor is submersed in liquid; and a controller connected to said probe sensor and said reference sensors to determine liquid level within the storage tank based on the capacitances of said sensors in accordance with the following equation:

$$f = \frac{R_{lg}(V_{gref} - R_{gp}V_{probe})}{R_{lg}V_{gref} - V_{lref}}$$

where:

f is a fractional liquid level value ranging from "0" (empty) to "1" (full), $V_{gref}$ is a measured voltage corresponding to the capacitance of the gas reference sensor, $V_{lref}$ is a measured voltage corresponding to the capacitance of the liquid reference sensor, $V_{probe}$ is a measured voltage corresponding to the capacitance of the probe sensor, $R_{lg}$ is a calibration ratio of the liquid reference sensor capacitance to the gas reference sensor capacitance, and $R_{gp}$ is a calibration ratio of the gas reference sensor capacitance to the probe sensor capacitance.

7. The system of claim 6 wherein said controller further includes:

means for driving each sensor with an electrical signal to produce a current which is output by the sensor and received by the controller, wherein the current output by each of the sensors corresponds to the sensor's capacitance;

current-to-voltage converters for receiving the currents output by the sensors and converting them to sensor voltages;

analog-to-digital converters for receiving and digitizing the sensor voltages to produce digitized sensor voltages;

a memory having stored therein calibration sensor voltages for each of the sensors, said calibration sensor voltages corresponding to digitized sensor voltages obtainable with each of the sensors submersed in a medium; and a microcomputer for receiving and processing the digitized sensor voltages and the calibration sensor voltages to determine liquid level.

8. The system of claim 6, further comprising:

a supply tank for containing liquid;

a liquid conduit interconnecting the storage and supply tanks; and a valve connected to said liquid conduit and controlled by said controller, said valve regulating transfer of liquid from the supply tank to the storage tank in response to signals received from the controller.

9. The system of claim 6 wherein said controller includes a user interface connected to said microcomputer for entering user commands and information to control the operation of the system, including specifying one or more liquid level setpoints defining liquid level limits within said storage tank.

10. The system of claim 9 wherein said one or more liquid level setpoints include:

a maximum setpoint defining a maximum acceptable liquid level within said storage tank;

a minimum setpoint defining a minimum acceptable liquid level within said storage tank;

a first intermediate setpoint defining a minimum desirable liquid level, wherein said controller is operable to open said valve so that liquid is transferred from the supply tank to the storage tank when liquid level within the storage tank reaches said first intermediate setpoint; and a second intermediate setpoint defining a maximum desirable liquid level, wherein said controller is operable to close said valve so that liquid transfer from the supply tank to the storage tank ceases when liquid level within the storage tank reaches said second intermediate setpoint.

11. The system of claim 18 wherein said controller further includes one or more indicators for indicating to a user when liquid level setpoints are reached.

12. A method for determining the level of a liquid within a container having a top and a bottom, said method comprising the steps of:

positioning a capacitive probe sensor having an upper end and a lower end within a liquid container so that the lower end of the probe sensor is submersed in liquid and the upper end of the probe sensor extends above the surface of the liquid with the liquid surface being at a level between the upper and lower ends of the probe sensor;

positioning a capacitive liquid reference sensor proximate the lower end of the probe sensor so that said liquid reference sensor is submersed within the liquid;

positioning a capacitive gas reference sensor proximate the upper end of the probe sensor so that said gas reference sensor is above the surface of the liquid; and calculating the level of the liquid within the container in accordance with the following equation:

$$f = \frac{R_{lg}(V_{gref} - R_{gp}V_{probe})}{R_{lg}V_{gref} - V_{lref}}$$

where:
- f is a fractional liquid level value ranging from "0" (empty) to "1" (full),
- $V_{gref}$ is a measured voltage corresponding to the capacitance of the gas reference sensor,
- $V_{lref}$ is a measured voltage corresponding to the capacitance of the liquid reference sensor,
- $V_{probe}$ is a measured voltage corresponding to the capacitance of the probe sensor,
- $R_{lg}$ is a calibration ratio of the liquid reference sensor capacitance to the gas reference sensor capacitance, and
- $R_{gp}$ is a calibration ratio of the gas reference sensor capacitance to the probe sensor capacitance.

13. A method for determining the level of a liquid within a container, said method comprising the steps of:

providing a capacitive probe sensor having an upper and a lower end;

providing a capacitive liquid reference sensor;

providing a capacitive gas reference sensor;

calculating a first calibration ratio $R_{lg}$ of the liquid reference sensor capacitance to the gas reference sensor capacitance;

calculating a second calibration ratio $R_{gp}$ of the gas reference sensor capacitance to the probe sensor capacitance;

storing said first and second calibration ratios;

positioning said capacitive probe sensor within a liquid container so that the lower end of the probe sensor is submersed in liquid and the upper end of the probe sensor extends above the surface of the liquid with the liquid surface being at a level between the upper and lower ends of the probe sensor;

positioning said capacitive liquid reference sensor proximate the lower end of the probe sensor so that said liquid reference sensor is submersed within the liquid;

positioning said capacitive gas reference sensor proximate the upper end of the probe sensor so that said gas reference sensor is above the surface of the liquid;

measuring a value $V_{probe}$ corresponding to the capacitance of the probe sensor; measuring a value $V_{lref}$ corresponding to the capacitance of the liquid reference sensor;

measuring a value $V_{gref}$ corresponding to the gas reference sensor; and calculating the level of the liquid within the container based on the following equation:

$$f = \frac{R_{lg}(V_{gref} - R_{gp}V_{probe})}{R_{lg}V_{gref} - V_{lref}}$$

where f is a fractional liquid level value ranging from "0" (empty) to "1" (full).

* * * * *